United States Patent [19]

Prins

[11] Patent Number: 5,133,224
[45] Date of Patent: Jul. 28, 1992

[54] HANDLEBARS WITH BIAXIAL ADJUSTMENT

[76] Inventor: Steven P. Prins, 11030 Evans St., Loma Linda, Calif. 92354

[21] Appl. No.: 751,519

[22] Filed: Aug. 29, 1991

[51] Int. Cl.$^5$ .............................................. B62K 21/16
[52] U.S. Cl. ................................... 74/551.3; 74/551.1
[58] Field of Search ........................... 74/551.3, 551.1; 280/278

[56] References Cited

U.S. PATENT DOCUMENTS 594,991 12/1897 Gilbert ................................. 74/551.3
689,217 12/1901 Palmer ................................. 74/551.3
5,033,325 7/1991 Giard, Jr. ......................... 280/278 X

FOREIGN PATENT DOCUMENTS 67343 7/1948 Denmark ............................ 74/551.3
997648 1/1952 France ................................ 74/551.6

Primary Examiner—Dirk Wright
Attorney, Agent, or Firm—James B. Middleton

[57] ABSTRACT

Bicycle handlebars are adjustable about two axes for providing great versatility in handlebar style. A U-shaped member is fixed to the post of the bicycle and is rotatable at the post in conventional fashion. An axle is fixed to the extending ends of the U-shaped member, and hand grips are fixed to the axle. The hand grips are selectively rotatable about the axle, so there are two axes of rotation, the two axes being parallel to each other. The post preferably includes a toggle joint for quick release, in addition to a screw to allow the clamp of the post to be completely opened.

7 Claims, 2 Drawing Sheets

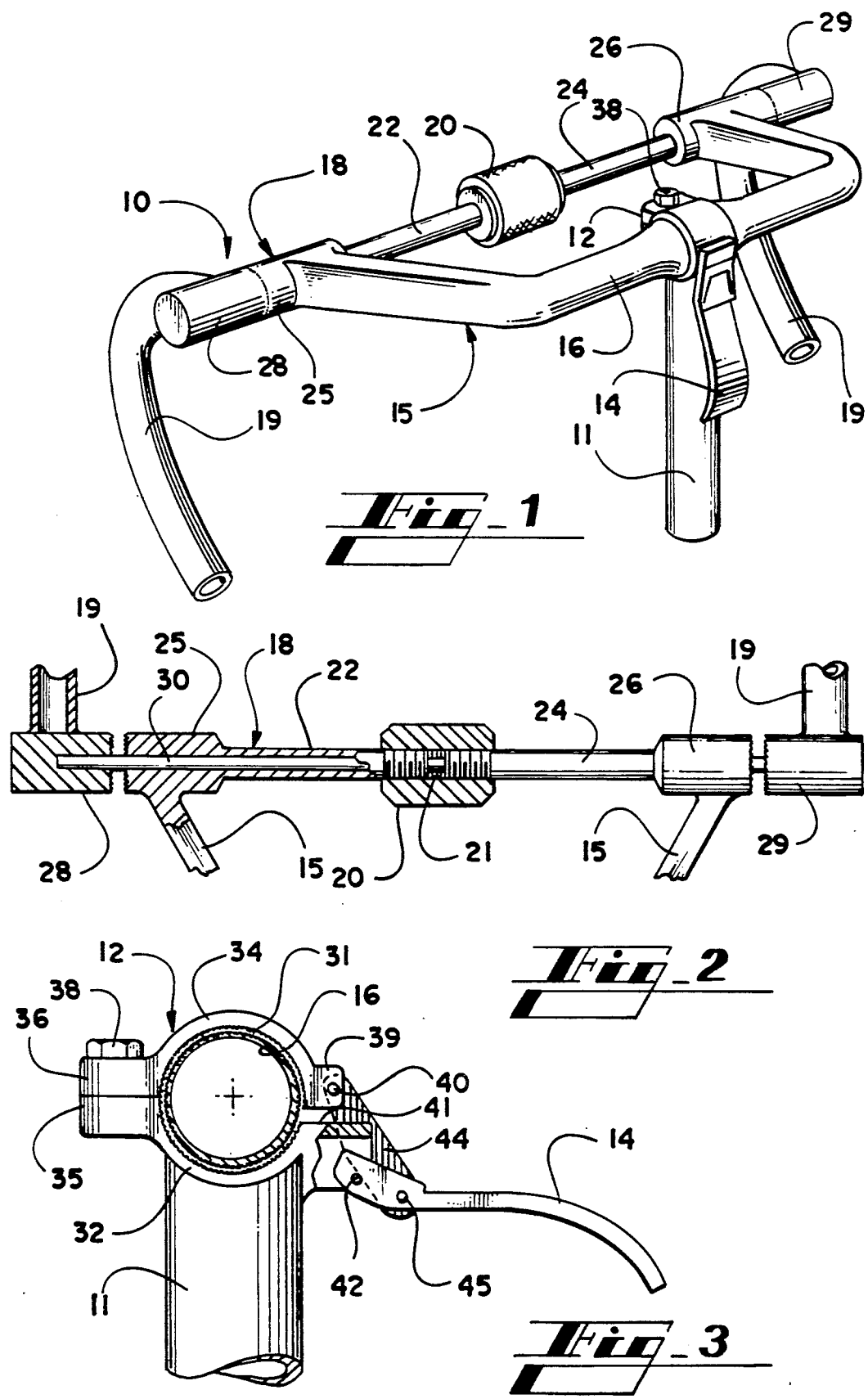

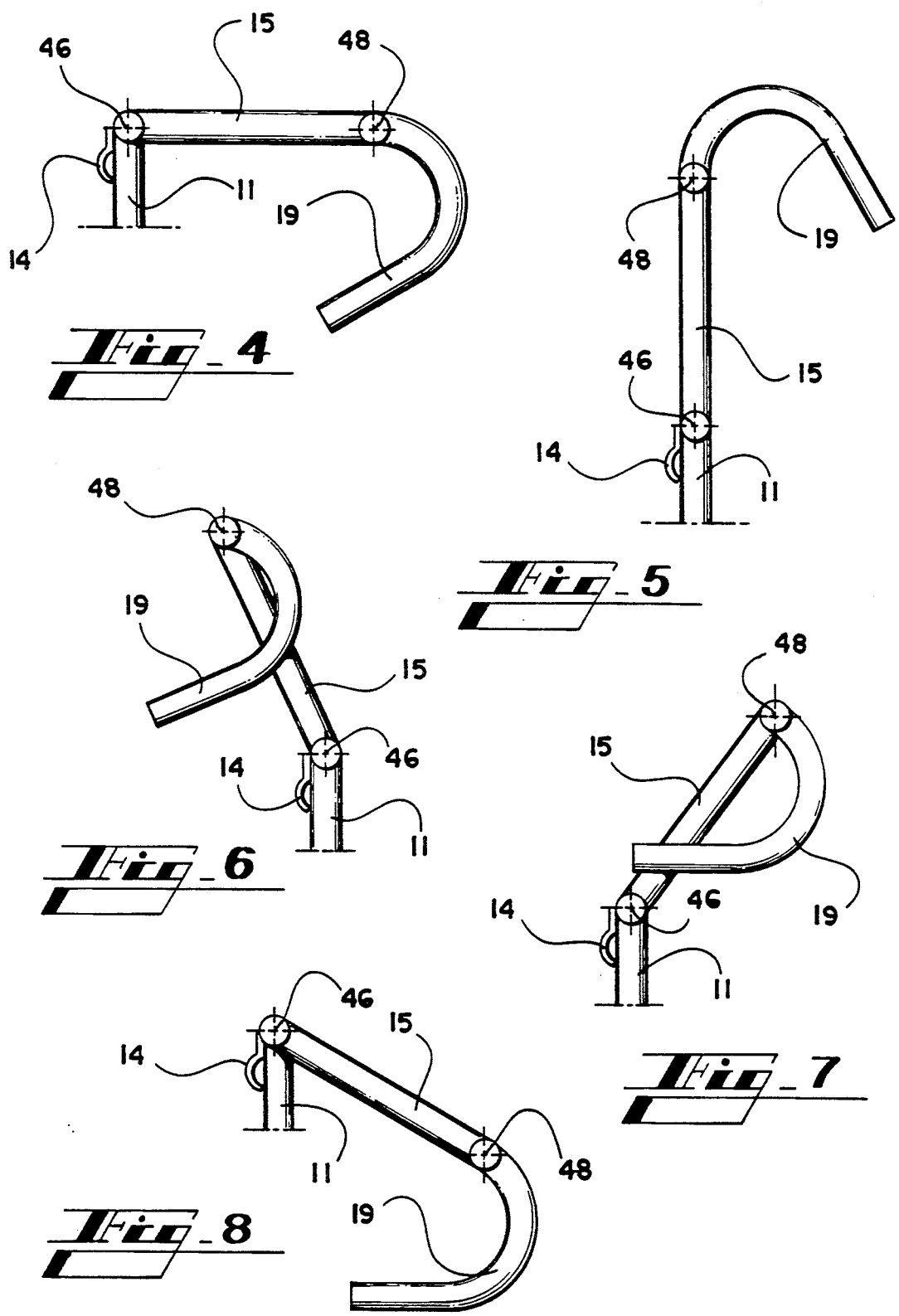

HANDLEBARS WITH BIAXIAL ADJUSTMENT

INFORMATION DISCLOSURE STATEMENT

Handlebars for bicycles and the like are well known in the art, and the handlebars are almost always adjustable about a centerline passing through the clamping member that holds the handlebar to the cycle. There have been many attempts at improving the clamping means for the handlebars, to allow the handlebar to be quickly adjusted and quickly secured. With the adjustment means, it tends also to be relatively easy to substitute one set of handlebars for another. Thus, if a person desires a low, racing-style handlebar, this style can be installed on a bicycle and rotated to the best position for the rider. However, if the rider decides to use the bicycle for sightseeing rather than racing, the rider is faced with the lowslung handlebars that generally require a somewhat crouching position for riding, the position resulting in considerable stress on the hands and wrists of the rider. Otherwise, the entire handlebar must be removed, and replaced with a different style of handlebars.

Thus, the prior art handlebars are generally made for one purpose, such as racing or pleasure riding, and the handlebars are not comfortably usable for other purposes.

SUMMARY OF THE INVENTION

This invention relates generally to handlebars for bicycles and the like, and is more particularly concerned with handlebars having biaxial adjustments for a more versatile handlebar.

The present invention provides a handlebar for a bicycle or the like, the handlebar having a bight portion fixable to the standard post on a bicycle, the bight portion being rotatable about its centerline. The handlebars also include an intermediate axis between the handlebar grips and the bight portion, the handlebar grips being rotatable about the intermediate axis independently of the rotation of the handlebars about the centerline of the bight portion. Thus, the handlebars of the present invention are rotatable about a first axis at the conventional post of the bicycle, and about a second axis parallel to the first axis and disposed between the first axis and the hand grip portions of the handlebars.

In the preferred embodiment of the invention, the bight portion of the handlebars is received by a post member having a quick release apparatus for easy adjustment of the handlebars about the first axis. The second axis also includes easy release means so the handlebars can be adjusted about the second axis without the use of tools.

BRIEF DESCRIPTION OF THE DRAWINGS

These and other features and advantages of the present invention will become apparent from consideration of the following specification when taken in conjunction with the accompanying drawings in which:

FIG. 1 is a perspective view showing one form of handlebars made in accordance with the present invention;

FIG. 2 is a fragmentary view showing the axle having the second axis, the axle being partially in cross-section;

FIG. 3 is an enlarged fragmentary view showing the quick release means the post of the bicycle; and, FIGS. 4–8 are schematic illustrations showing some of the positions possible with the handlebars of the present invention.

DETAILED DESCRIPTION OF THE EMBODIMENT

Referring now more particularly to the drawings, and to that embodiment of the invention here presented by way of illustration, the handlebars of the present invention are generally indicated at 10, and are carried by a post 11 which terminates in a clamp 12. Those skilled in the art will readily understand that the post 11 is receivable in the conventional fork housing of the bicycle where it is fixed with respect to the forks to allow the bicycle to be guided. The fitting that includes the post 11 and clamp 12 is sometimes referred to as a "gooseneck".

FIG. 1 shows a clamp 12, which includes a quick release handle 14 so the handlebars 10 can be quickly released and adjusted to the desired setting. The clamp 12 will be discussed in more detail hereinafter.

The handlebars 10 include a generally U-shaped member designated at 15, the U-shaped member 15 including the bight portion 16 which is received by the clamp member 12. It will therefore be understood that the bight portion 16 can be rotated within the clamp member 12 when the clamp member 12 is released, thereby allowing the U-shaped member 15 to be rotated about the centerline of the bight member 16.

The extending ends of the U-shaped member 15 carry an axle generally designated at 18. The axle 18, in turn, carries the grip portions 19 of the handlebars 10. As will be discussed fully hereinafter, the grip members 19 are rotatable about the axle 18; therefore, with rotation of the U-shaped member 15 about the centerline of the bight portion 16, considerable variation in the configuration of the handlebars 10 is possible.

FIG. 2 shows the construction of the axle 18 in more detail, and here it will be seen that the axle 18 includes a hand wheel 20 having a central bore 21. The bore 21 is threaded to receive threaded shafts 22 and 24. The shafts 22 and 24, and the complementary threads within the bore 21 are opposite each other. That is to say, the threads on one of the shafts 22 and 24 is a right hand thread, while the thread on the other shaft is a left hand thread. With this arrangement, when the hand wheel 20 is rotated in one direction, the shafts 22 and 24 will move towards each other, and when the hand wheel 20 is rotated in the opposite direction, the shafts 22 and 24 will move away from each other.

The shafts 22 and 24 terminate in enlarged end portions 25 and 26 which are fixed to the extending ends of the U-shaped member 15. In view of the above description, it will now be understood that, when the hand wheel 20 is rotated in one direction, the shafts 22 and 24 will move towards each other, thereby causing the arms of the U-shaped member 15 to move towards each other. Only when the hand wheel 20 is rotated in the opposite direction will the arms of the U-shaped member 15 be allowed to return to their normal positions as shown in FIG. 1.

The hand grips 19 are fixed to end members 28 and 29 of the axle 18. These end member 28 and 29 are carried by a continuous rod 30 which extends from the end member 28, through the rod 22 and the rod 24, and into the end member 29. The end members 28 and 29 are fixed with respect to the rod 30, so the hand grips 19 will always move together and be parallel to each other.

The adjacent faces of the end member 28 and enlarged member 25, as well as the end member 29 and enlarged member 26, have notched or otherwise complementary surfaces. Thus, when the complementary surfaces are engaged, the end members 28 and 29, hence handgrips 19, are rotationally fixed with respect to the U-shaped member 15; and, when these surfaces are separated as shown in FIG. 2, the end members are rotationally released.

It should now be understood that the axle 18 provides for selective rotation of the handgrips 19 with respect to the U-shaped member 15. Those skilled in the art will readily devise numerous other mechanical arrangements to accomplish the same result, many locking means being well known in the art. The important feature with respect to the present invention is that there is an axis about which the handgrips 19 are rotatable with respect to the U-shaped member 15.

Attention is now directed to FIG. 3 of the drawings which shows the clamp 12 in more detail. It will be noted in FIG. 3 that the quick release handle 14 is in its released position, so the bight portion 16 of the U-shaped member 15 is freely rotatable within the bore 31 of the clamp 12.

The clamp 12 includes a lower jaw member 32 and an upper jaw member 34. The lower jaw member 32 is fixed to the post 11 while the upper jaw 34 is movable with respect to the lower jaw 32. The upper jaw 34 is normally fixed to the lower jaw 32 by means of complementary bosses 35 and 36 having a screw 38 therethrough. The rear of the jaw 34 is then selectively movable by means of the quick release handle 14.

The upper jaw 34 includes an extension 39 having a pin 40 therethrough. The lower jaw 32 has a similar, though larger, rearward extension 41 having a pin 42 therethrough. The two jaws are then connected by a link 44 which is connected to the pin 40 at one end, and to a toggle pin 45 at its opposite end, the pin 45 being on the quick release handle 14.

Those skilled in the art will quickly recognize that the arrangement described constitutes a toggle. In the position shown in FIG. 3 of the drawings, the handle 14 is up, and the upper jaw 34 is moved away from the lower jaw 32 to allow rotation of the handlebar 10. When the handle 14 is urged downwardly and inwardly, against the post 11, the pin 45 will move inwardly and downwardly, pulling the pin 40 downwardly to cause clamping of the clamp member 12. The pin 45 will move until the pins 40, 42 and 45 are in a single line; then, as the pin 45 moves somewhat farther inward, the arrangement will be locked. Such toggles are well known to those skilled in the art and no further description should be necessary.

While most bicycle handlebar clamps include either a screw for holding the handlebar or a quick release for holding the handlebar, the arrangement of the present invention includes both. Looking at FIG. 1 of the drawings, it will be understood that the handlebar 10 cannot be slid laterally to remove the handlebar from the clamp 12. As a result, it is desirable to include the screw 38 to allow the upper member 34 of the clamp 12 to be completely opened for exchange of handlebars if desired.

With the above description in mind, attention is directed to FIGS. 4-8 of the drawings. These figures show the handlebar 10 rather schematically, illustrating the post 11, U-shaped member 15 and handgrips 19. The axes between the members are indicated, the centerline of the bight portion 16 being indicated as axis 46, and the axis of the axle 18 being indicated as 48.

In FIG. 4 it will be noted that the U-shaped member 15 extends generally forwardly from the post 11, and the handgrip 19 then curves forwardly and downwardly from the axis 48. Thus, the rider of the bicycle must lean forward and somewhat down to reach the handgrips 19. This would place the rider in a position somewhat like that of a bicycle racer, though not in an extreme position.

In FIG. 5, the handlebar 10 is adjusted with the U-shaped member 15 extending vertically from the post 11, and the handgrip 19 then curving upwardly and forwardly from the axis 48. The rider of the bicycle will therefore sit upright on the seat of the cycle, and reach forward to engage the handgrips 19. This will place the rider in what might be termed a sightseeing position.

FIGS. 6 and 7 show the handlebar 10 in positions to simulate normal, general purpose handlebars. In FIG. 6, the U-shaped member 15 leans somewhat rearwardly of the bicycle with the handgrips 19 extending forwardly and downwardly from the axis 48. In FIG. 7, the U-shaped member 15 angles forwardly from the post 11 rather than rearwardly. The positions shown in FIGS. 6 and 7 are therefore about the same, except that the handgrips 19 are more rearwardly in FIG. 6 and more forwardly in FIG. 7.

FIG. 8 is similar to FIG. 4 except that the U-shaped member 15 angles downwardly to place the handgrips 19 farther down. The position in FIG. 8 would therefore be appropriate for racing wherein the rider wishes to lean down as much as possible to reduce wind drag.

It will therefore be understood that the present invention provides a handlebar for a bicycle or the like, the handlebars being adjustable about two parallel axes spaced from each other. The handlebar of the present invention can therefore be adjusted for virtually any style of riding one might wish, the handlebars being preferably adjustable by a rider without tools or the like, though the adjustable features would be desirable even with axes requiring wrenches for adjustment.

It will therefore be understood by those skilled in the art that the particular embodiment of the invention here presented is by way of illustration only, and is meant to be in no way restrictive; therefore, numerous changes and modifications may be made, and the full use of equivalents resorted to, without departing from the spirit or scope of the invention as outlined in the appended claims.

I claim:

1. Handlebars for a cycle, wherein said cycle includes a post for receiving said handlebars, said post including a clamp for selectively holding said handlebars, said handlebars comprising a U-shaped member having a bight portion, said bight portion being receivable in said clamp, said bight portion having a centerline constituting a first axis, said U-shaped member being selectively rotatable about said first axis, a second axis at the extending ends of said U-shaped member, and grip portions carried by said extending ends of said U-shaped member, said grip portions being selectively rotatable about said second axis.

2. Handlebars as claimed in claim 1, and further including axle means carried at the extending ends of said U-shaped member, said axle means including end members having said grip portions fixed thereto, and means for selectively fixing said end portions with respect to said axle means.

3. Handlebars as claimed in claim 2, said axle means including a pair of shafts extending along said second axis, said shafts having end portions fixed to said extending ends of said U-shaped member, and means for selectively urging said pair of shafts axially towards each other and away from each other for selectively causing said shafts to engage said end members and to release said end members.

4. Handlebars as claimed in claim 3, said axle further including a handwheel defining a threaded bore therethrough, said pair of shafts threadedly engaging said threaded bore so that rotation of said handwheel causes axial motion of said pair of shafts.

5. Handlebars as claimed in claim 4, wherein said axle includes a rod extending along said second axis and fixed to said end portions, said rod being received through central bores in said pair of shafts.

6. Handlebars as claimed in claim 1, said clamp including a lower clamp member and an upper clamp member, said lower clamp member being fixed to said post, screw means for selectively fixing one side of said upper clamp member to said lower clamp member, and quick release means for selectively fixing the opposite side of said upper clamp member to said lower clamp member.

7. Handlebars as claimed in claim 6, said quick release means comprising a toggle joint including a toggle handle for release of said toggle joint.

* * * * *